(No Model.) S. M. FAY. 2 Sheets—Sheet 2.
BICYCLE.
No. 424,870. Patented Apr. 1, 1890.
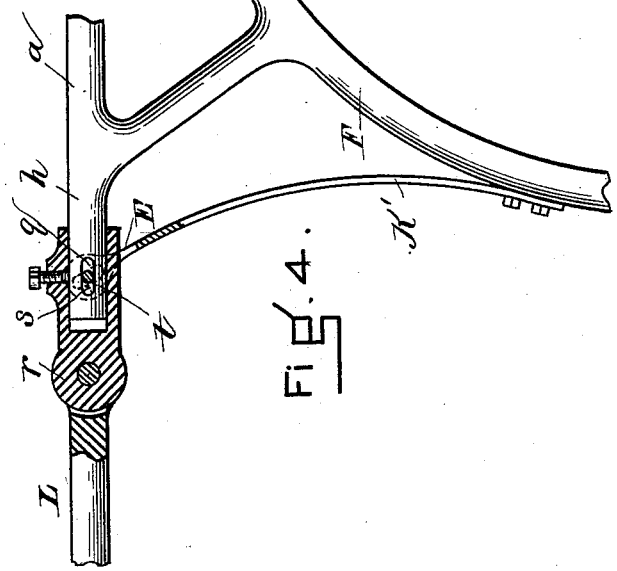
Fig. 4.
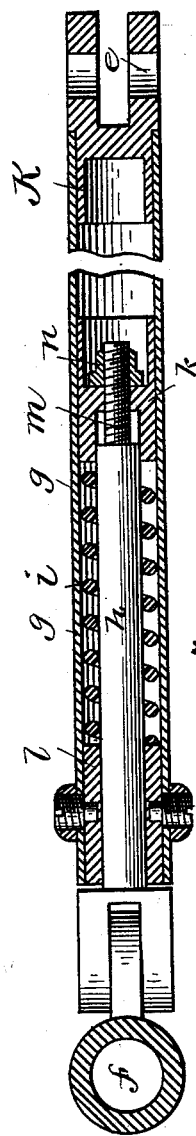
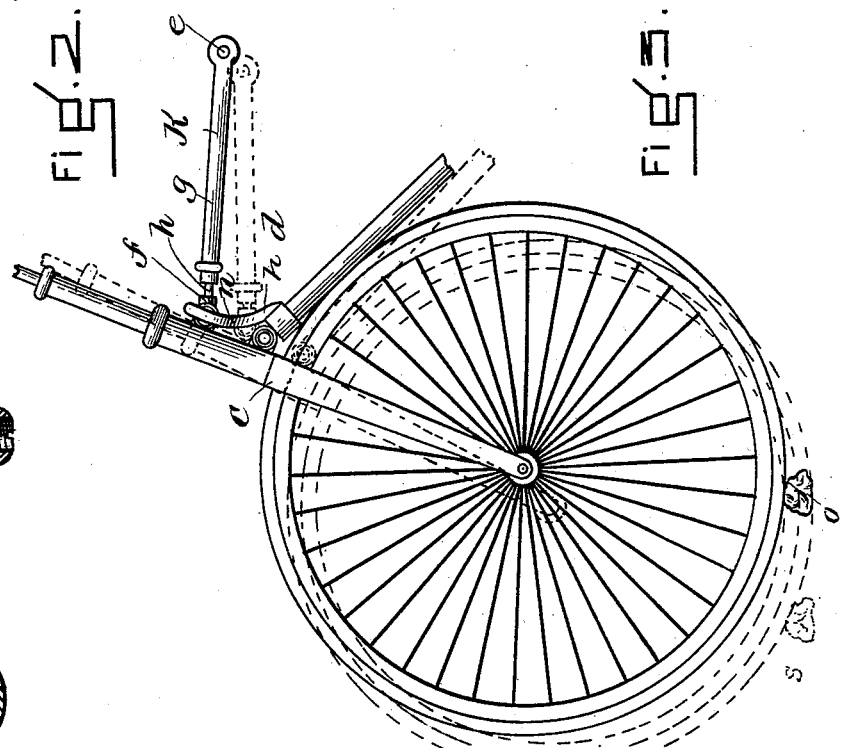
Fig. 2.
Fig. 3.
WITNESSES.
INVENTOR

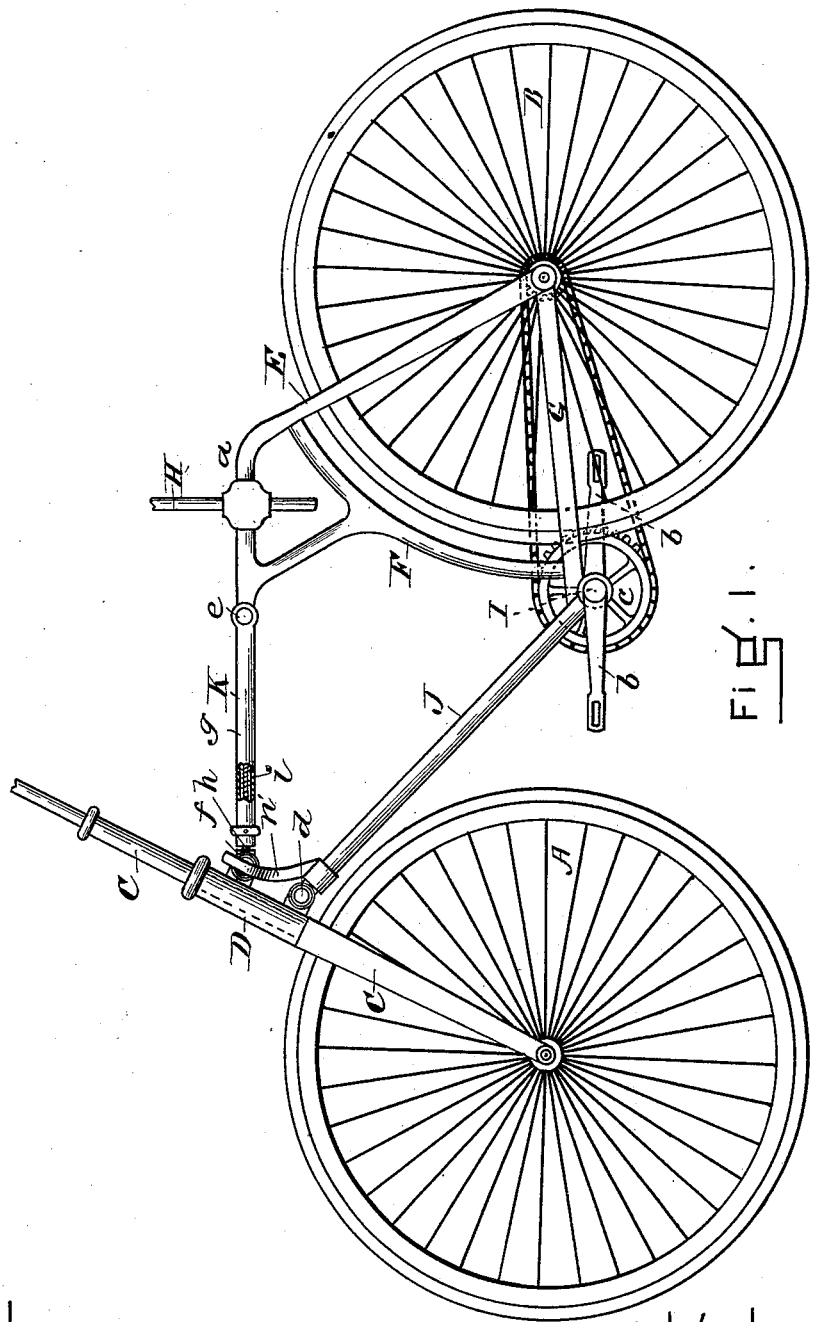

UNITED STATES PATENT OFFICE.

STILLMAN M. FAY, OF BOSTON, MASSACHUSETTS, ASSIGNOR OF ONE-HALF TO HENRY B. SPROUL, OF SAME PLACE.

BICYCLE.

SPECIFICATION forming part of Letters Patent No. 424,870, dated April 1, 1890.

Application filed December 14, 1889. Serial No. 333,761. (No model.)

*To all whom it may concern:*

Be it known that I, STILLMAN M. FAY, of Boston, in the county of Suffolk and State of Massachusetts, have invented certain new and useful Improvements in Bicycles, of which the following is a specification.

The object of my invention is to furnish a velocipede of the bicycle type that will permit the front wheel to yield or swing backward when it meets an obstruction in the way, so that said wheel will readily rise and ride over said obstruction.

My invention also has for its object to provide a seat-supporting frame which shall afford a vertically-unyielding support for the rider, or, in other words, will not allow any variation in the distance between the rider's seat and the crank-pedal shaft, so that the rider's feet shall always have a firm support without yielding movement between the seat and pedals.

For the attainment of the above-named objects my invention consists in certain improvements, all as hereinafter particularly described, and set forth in the claims.

In the accompanying drawings, forming a part of this specification, Figure 1 illustrates my improvements as applied to a bicycle generally known as a "Safety" bicycle. Fig. 2 illustrates a detail enlarged and in longitudinal section of a part of the construction shown in Fig. 1. Fig. 3 illustrates the positions the front wheel and link will assume while the former is riding over an obstruction, the dotted lines showing the position of the parts before the wheel has begun to rise. Fig. 4 illustrates a modification in detail.

Similar letters represent like parts in all the figures.

A is the front wheel of the bicycle, and B is the rear wheel of the same.

C is the upright fork or support for the front wheel, and D is the sleeve in which said fork is adapted to turn, and to which sleeve are attached the connections which support the rear wheel.

E is the upright fork or support for the back wheel.

F is the hanger, which extends downward from the upright E and in front of the wheel B, and G is the brace connecting the upright E with the hanger F. These three parts E, F, and G are preferably made in one piece, and form a firm, rigid, and unyielding frame and support for the rider, the saddle standard or rod H being supported on a horizontal forward extension $a$ of the support E, the driving-pedals $b$ and sprocket-wheel $c$ being journaled upon a shaft I at or near the intersection of the parts F and G of the rigid frame.

J is an inclined brace, which is pivoted at its lower end to the journal I of the sprocket-wheel $c$, to the hanger F, or to the brace G, and the upper end of said brace J is pivoted at $d$ to the sleeve D of the upright support or fork C. This construction will permit of the support C and its wheel A swinging on the pivot $d$. The horizontal extension $a$ of the support E, instead of extending from said support to the sleeve D, as is usual, extends only a little beyond the saddle-support H, and at said point $e$ one end of a yielding and springing link K is pivoted, the other end of said link being pivoted at $f$ to the sleeve D. This springing and yielding link K will permit of the support or fork C turning on the pivot $d$ with its lower end and the wheel A oscillating or yielding backward or toward the back wheel B, as shown in Fig. 3, when an obstruction has arrested the forward portion of the wheel A, and as soon as said obstruction has been passed the springing quality of the link K will bring the fork C and the wheel A back to their original position, as in Fig 1.

The connection of the springing link K with the rigid frame E, F, and G and with the sleeve C should be such that the normal position of the parts should practically make an unyielding and rigid connection between the supports of the two wheels, and thus give a firm and rigid seat and foot support for the rider, excepting the slight yielding motion derived from the spring-saddle, (not shown,) and also to prevent the sleeve D and that part of the fork C above the pivot $d$ from yielding backward, as well as to prevent the wheel A from swinging or yielding in a forward direction.

To prevent the support or fork C and the sleeve D at the connection with the link K from wabbling or swaying from side to side, and thereby running the risk of breaking off said link at its connection with the sleeve D, I extend upward from the brace G two short braces $n'$, with their sides in contact with and bearing against the ends of the pivotal connection of said link and support.

A very simple and efficient spring-link K is shown in Figs. 1, 2, and 3. It is constructed of an outer piece $g$, which is tubular at its forward end, the rear end of which is pivoted at $e$ to the part $a$ of the rear support. A rod $h$ is pivoted at $e$ to the sleeve D, and this rod enters into the tubular portion of $g$ and is adapted to slide back and forth telescopically therein. A coil-spring $i$ encircles the rod $h$ in the tube or sleeve $g$, with one end of said spring fixed in the sleeve and the other end attached to the rod in such manner that the normal action of the spring will hold the rod $h$ with its rear end abutting against the end of the sleeve, thereby making the link K virtually a rigid connection against the forward swing of the front wheel and the backward play of the fork C above the pivot $d$. Any power that will cause the front wheel to swing backward on its pivot $d$ will withdraw the rod $h$ away from the sleeve $g$ and force the spring $i$ against its normal action, and as soon as said power is removed the resilient action of the spring will return the rod $h$ and the support C, as well as the wheel A, to their normal position.

In Fig. 2 I have shown the parts so constructed that the outward movement of the rod $h$ in its sleeve $g$ will contract the spring $i$. The rod is provided with a collar $k$ at its rear end, which fits snugly in the sleeve $g$, but loosely enough to readily slide back and forth in said sleeve. A movable sleeve $l$ fits into the outer end of the sleeve $g$ and is adapted to be secured in the sleeve $g$, and through the sleeve $l$ the outer end of the rod $h$ passes and is adapted to slide. The spring $l$ encircles the rod $h$ between its collar $k$ and the sleeve $l$, and the ends of said spring are adapted to abut against said collar and sleeve. Any outward pull of the rod $h$ will draw its collar $k$ and the rear end of the spring $i$ forward, and the forward end of said spring being held by the sleeve $l$ said spring will be tightened. As soon as the power on the rod $h$ is released the spring $i$ will contract and resume its normal position, carrying back the rod $i$ and its connecting parts to their former positions, making the link rigid again, as above described. If desired, the collar $k$ may be made removable and adjustable upon the rod $h$ by means of a screw $m$ on the end of said rod passing through said collar and held thereon by a nut $n$, or said screw may simply engage with a female screw-thread in said collar. The sleeve $l$ may be attachable to the sleeve $g$ in any convenient or desired manner.

In place of the spring-link K, as above described, a strong upright bow-spring K' may be used, and in such case the lower end of said spring should be secured to the hanger F, and a rigid link L should be pivoted at its rear end to the top of said spring and at its front end to the support C at $e$. The connection of the rigid link with the spring K should be so made that the resilience of the spring keeping the link in its normal position should also make a rigid connection with the hanger F, for the reasons above described. This may be accomplished in the following manner: The horizontal part $a$ of the hanger which supports the saddle-standard H has a forward projection or nose $p$, in which is a horizontal slot $q$. A short sleeve $r$ is pivoted to the rear end of the link K and incloses the nose $p$. Said sleeve also has a horizontal slot $s$, corresponding with the slot $q$ of the nose. The upper end of the spring K' is bifurcated and extends on either side of the sleeve $r$, and a pin $t$ passes through said bifurcations and through the slots $q$ and $s$, thus allowing the sleeve $r$ and the rigid link L to give in a forward direction. The resilient action of the spring K' keeps the pin $t$ against the back ends of the slots $q$ and $s$, thus constituting a rigid connection between the link L and the hanger F from the backward movement of the upper end of the support C.

From the above it will be seen that when an obstruction—such as a stone $o$, Figs. 1 and 3—be encountered by the front wheel A said wheel and its support C will swing back on its pivot $d$ and at the same time rise, (see Fig. 3,) so as to pass over said obstruction, and as soon as the obstruction has been passed the spring-link will return the support C and wheel A to their normal and rigid positions.

It will be seen that the fulcrumed fork and the yielding connections between the fork and the frame take up the jars and vibrations incidental to the use of the machine and thus make the machine more durable as well as easier for the rider.

I claim—

1. In a bicycle, the combination, with the fork, the forward wheel journaled in bearings in the fork, the rear wheel, and the intermediate crank or pedal shaft having a sprocket-wheel, of a connecting frame or structure consisting of the rigid frame directly supporting the seat and having bearings for the rear wheel and for the sprocket-wheel, the link or brace J, connected at one end with the frame portion E, F, and G and at the other end with the fork by a pivot $d$, and an extensible connection between the frame and a point on the fork above the pivot $d$, said connection being normally contracted and constituting a rigid support against backward movement of the portion of the fork above the pivot $d$, but adapted to yield to permit forward movement of said portion of the fork and backward movement of the lower portion of the fork and of the forward wheel, said connecting frame or structure affording a vertically-unyielding support for the rider and permitting backward or yielding movement of the front wheel, as set forth.

2. In a bicycle, the combination, with the fork, the front wheel journaled therein, and the rear wheel, of the connecting-frame composed of the rigid portion E, F, and G, the brace J, connected at one end to said rigid portion and at the other end by a pivot $d$ with the fork, the yielding telescopic link K, pivoted at one end to the portion E, F, and G and at the other end to the fork, and the parallel braces or supports affixed to the brace J and bearing on opposite ends of the pivot that connects the link K with the fork, whereby the pivots connecting the brace J and link K with the fork are supported, as set forth.

In testimony whereof I have signed my name to this specification, in the presence of two subscribing witnesses, this 7th day of December, A. D. 1889.

STILLMAN M. FAY.

Witnesses:
HARRY B. SPROUL,
C. F. BROWN.